(12) United States Patent
Hoffman et al.

(10) Patent No.: US 12,372,951 B2
(45) Date of Patent: Jul. 29, 2025

(54) DYNAMIC COMMAND NOTCH FILTER

(71) Applicant: Rockwell Automation Technologies, Inc., Mayfield Heights, OH (US)

(72) Inventors: Jonathan D. Hoffman, Milwaukee, WI (US); Vishesh Gattani, Johns Creek, GA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 417 days.

(21) Appl. No.: 18/079,282

(22) Filed: Dec. 12, 2022

(65) Prior Publication Data

US 2024/0192667 A1    Jun. 13, 2024

(51) Int. Cl.
G05B 19/418    (2006.01)

(52) U.S. Cl.
CPC ..... *G05B 19/4187* (2013.01); *G05B 19/4183* (2013.01); *G05B 19/41885* (2013.01)

(58) Field of Classification Search
CPC ............ G05B 19/4187; G05B 19/4183; G05B 19/41885; G05B 2219/39176; G05B 2219/39186; G05B 2219/39335; G05B 2219/41032; G05B 19/404; B25J 9/1641
USPC ............ 318/568.22, 568.11, 568.1, 567, 560
See application file for complete search history.

(56) References Cited

U.S. PATENT DOCUMENTS

| | | | |
|---|---|---|---|
| 4,980,625 A | 12/1990 | Shimada | |
| 9,654,032 B2 * | 5/2017 | Barrass | H02P 7/298 |
| 10,938,967 B2 | 3/2021 | Xu et al. | |
| 11,283,388 B1 | 3/2022 | Sizov et al. | |
| 2001/0033146 A1 | 10/2001 | Kato et al. | |
| 2014/0217952 A1 | 8/2014 | Miyaji | |
| 2019/0384233 A1 | 12/2019 | Iwase | |
| 2022/0314441 A1 | 10/2022 | Sejimo | |

FOREIGN PATENT DOCUMENTS

JP    2006113960 A    4/2006

OTHER PUBLICATIONS

Mohamed et al.; "Command Shaping Techniques for Vibration Control of a Flexible Robot Manipulator"; Mechatronics 14 (2004) pp. 69-90—(22) pages.

(Continued)

*Primary Examiner* — David Luo
(74) *Attorney, Agent, or Firm* — Boyle Fredrickson, S.C.

(57) ABSTRACT

A system and method for reducing mechanical oscillations in a multi-axis control system provides a first command for a dynamic notch filter at a first update rate to multiple motor drives. Each motor drive is operatively connected to a motor for an axis in the multi-axis control system. Each motor drive receives a second command for desired operation of the motor at a second update rate. Operation of the dynamic notch filter in each motor drive is changed as a function of the first command at the first update rate, and each motor drive generates a desired output voltage for desired operation of the motor at a third update rate. The third update rate is faster than the second update rate, the second command is passed through the dynamic notch filter to generate a filtered command, and the desired output voltage is generated as a function of the filtered command.

20 Claims, 7 Drawing Sheets

(56) References Cited

OTHER PUBLICATIONS

Singhose et al.; "Reducing Vibration by Digital Filtering and Input Shaping"; IEEE Transactions on Control Systems Technology, vol. 19, No. 6, Nov. 2011; pp. 1410-1420—(11) pages.
Anonymous, "Motion System Tuning—Application Technique, Original Instructions/Publication MOTION-AT005D-EN-P," published Nov. 4, 2020 <https://literature.rockwellautomation.com/idc/groups/literature/documents/at/motion-at005_-en-p.pdf> (pp. 1-112).
Extended European Search Report for Application No. 23214244.8 dated Apr. 23, 2024 (13 pages).

* cited by examiner

DYNAMIC COMMAND NOTCH FILTER

BACKGROUND INFORMATION

The subject matter disclosed herein relates to a method for reducing mechanical oscillations in a multi-axis control system. More specifically, a dynamic notch filter is provided in a motor drive for each axis of the control system, wherein operation of the dynamic notch filter is updated as a function of the position and loading present in the multi-axis control system.

As is known to those skilled in the art, motor drives are utilized to control operation of a motor. The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the motor drive supplies the variable amplitude and varying frequency voltage to obtain desired operation of the motor.

In multi-axis applications, a controlled machine or process includes multiple axes having coupling between different axes. At least one motor is required to control operation of each axis, and operation of one motor impacts operation of another motor. One example of multi-axis control is a robot. A motion trajectory for the robot is typically defined in terms of a path of travel for an end effector for the robot. In other words, motion of the robot is defined based on a desired path of the tool, the gripper, or other device connected at the end of the robot. The desired path may be a straight line or a curvilinear path in two or three dimensions between a starting point and an ending point. To obtain the desired path, each joint of the robot is independently controlled such that the net effect of the robot's motion is to have the end effector follow the desired path.

Each joint of the robot includes an axis of motion. The axis of motion is defined by a motor and a motor drive to control the motor. The joint further includes a gearbox or other mechanical coupling between an output shaft of the motor and a mechanical link for the robot, where each mechanical link spans between two joints. A first axis of motion for the robot is connected to a base for the robot. The base may be the ground, a mounting plate, or other surface providing a rigid, stationary connection to which the robot is mounted. A first motor and a first motor controller are provided to control the first axis of motion. Additional motors and motor controllers are configured to control each intermediate axis of motion for the robot. A final motor and motor controller are used to control a tool, a gripper, or other end effector of the robot.

As a robot moves along a commanded trajectory, each of the joints moves according to a motion profile for the joint such that the combined motion meets the commanded trajectory. As is understood in the art, the couplings between motor and gearbox and between the gearbox and the mechanical link typically have some backlash. Some couplings are compliant to absorb some of the forces between the drive shaft and gearing associated with the motor changing direction or changing speed. Even in systems where rigid couplings are provided, some flexing of the mechanical link may still occur or some backlash is still present. The backlash, compliant couplings, or flexing of mechanical linkages cause each link of the robot to operate as a spring-mass system. When starting and stopping or when changing speeds, the acceleration and deceleration of each link excites the spring portion of the spring-mass system to an extent, creating some oscillation in the joint. These oscillations may cause some following error in the position of an axis and require either some settling time when arriving at a commanded position or a reduced rate of acceleration and deceleration to minimize the amplitude of oscillations. An increased settling time or a reduction in acceleration and deceleration rates reduces throughput and productivity of the robotic system.

Thus, it would be desirable to provide a method and system for reducing these mechanical oscillations in a multi-axis control system.

BRIEF DESCRIPTION

According to one embodiment of the invention, a method for reducing mechanical oscillations in a multi-axis control system receives at multiple motor drives a first command for a dynamic notch filter at a first update rate and a second command for desired operation of the motor at a second update rate. Each motor drive is operatively connected to a motor for an axis in the multi-axis control system. Operation of the dynamic notch filter is changed in each motor drive as a function of the first command at the first update rate, and a desired output voltage for desired operation of the motor is generated from the motor drive at a third update rate. The third update rate is faster than the second update rate, the second command is passed through the dynamic notch filter to generate a filtered command, and the desired output voltage is generated as a function of the filtered command.

According to another embodiment of the invention, a system for reducing mechanical oscillations in a multi-axis control system includes an industrial controller and multiple motor drives. The industrial controller is operative to generate a first command at a first update rate and a second command at a second update rate. The first command is for a dynamic notch filter and the second command is a desired motion of at least one motor. Each motor drive is in communication with the industrial controller and controls operation of at least one motor in the multi-axis control system. Each motor drive receives the first command and the second command from the industrial controller and changes operation of the dynamic notch filter as a function of the first command at the first update rate. Each motor drive further passes the second command through the dynamic notch filter to obtain a filtered command and generates an output voltage for desired operation of the at least one motor connected to the motor drive as a function of the filtered command.

According to still another embodiment of the invention, a method for reducing mechanical oscillations in a multi-axis control system includes receiving at each of multiple motor drives a feedback signal corresponding to an angular position of a motor. The motor is operatively connected to one of the motor drives, and the feedback signal is provided to a corresponding motor drive to which the motor is operatively connected. The angular position of the motor is transmitted from each motor drive to an industrial controller. The industrial controller generates a first command for a dynamic notch filter at a first update rate, and the industrial controller generates a second command for desired operation of the motor connected to each motor drive at a second update rate. Operation of the dynamic notch filter is changed as a function of the first command at the first update rate, and the second command is passed through the dynamic notch filter to generate a filtered command. A desired output voltage for desired operation of the motor in each of the plurality of motor drives is generated at a third update rate and as a function of the filtered command, where the third update rate is faster than the second update rate.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
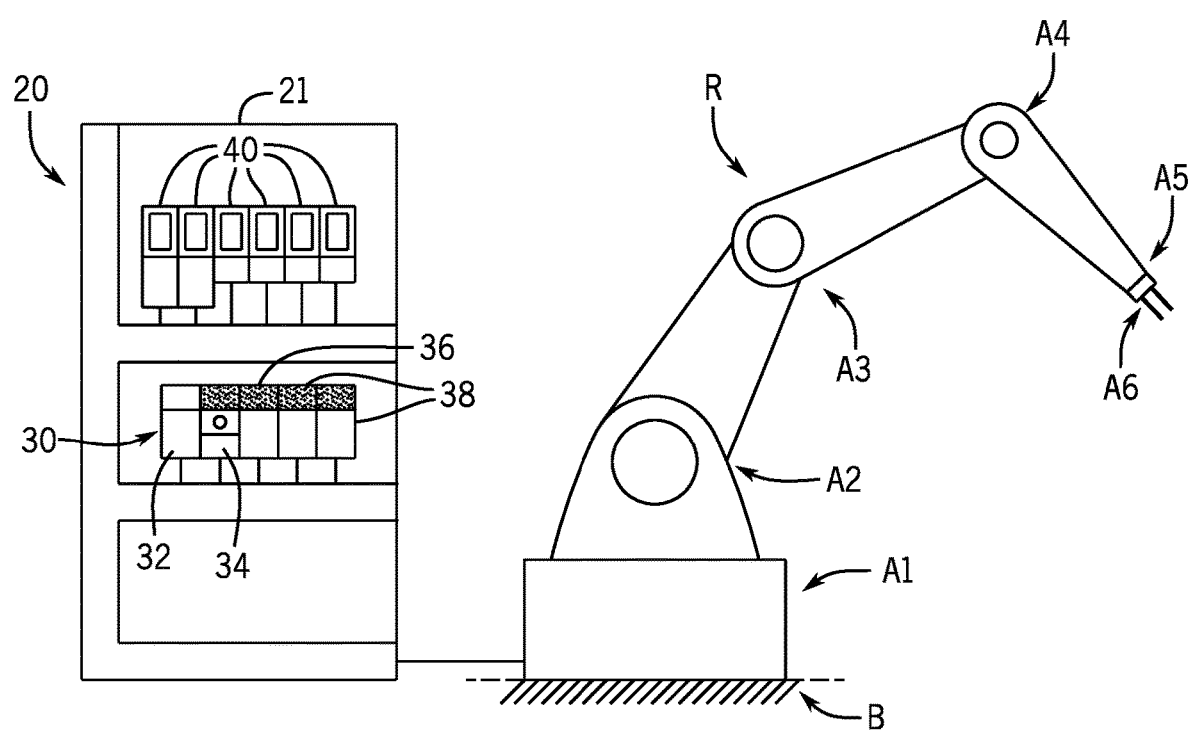
FIG. 1 is an exemplary environmental view of a robot and control system incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
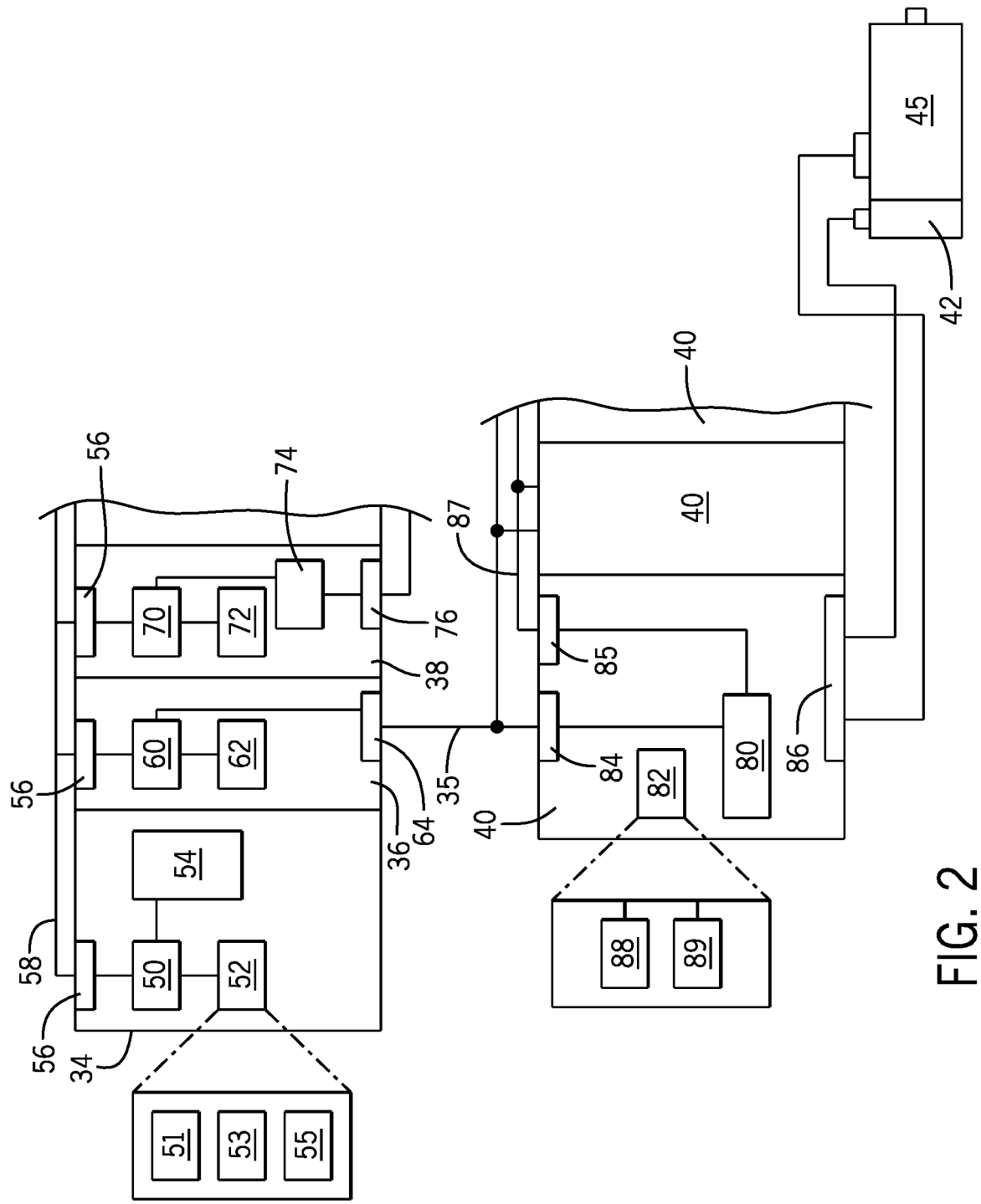
FIG. 2 is a schematic representation of a portion of the control system for the robot and controller of FIG. 1.

Referring initially to FIGS. 1 and 2, an industrial control system 20 may include an industrial controller 30 made up of multiple modules. The industrial controller 30 is configurable and may include, for example, a power supply module 32, a processor module 34, a network module 36, and various additional modules 38 according to an application's requirements. The network module 36, processor module 34, or a combination thereof may communicate on an industrial control network 35, such as ControlNet®, DeviceNet®, or EtherNet/IP®, between the industrial controller 30 and other devices connected to the industrial controller. The industrial controller 30 may be, for example, a programmable logic controller (PLC), a programmable automation controller (PAC), or the like. It is contemplated that the industrial controller 30 may include still other modules, such as a motion control module, one or more axis control modules, or additional racks connected via the industrial control network 35. Optionally, the industrial controller 30 may have a fixed configuration, for example, with a predefined number of network and I/O connections.

The industrial control network 35 may join the industrial controller 30 to remote I/O modules (not shown) and one or more motor drives 40, the latter of which may communicate with corresponding electric motors 45 and position sensors 42 to provide for controlled motion of the electric motors 45. The controlled motion of the electric motors, in turn, controls associated industrial machinery or processes. While a single motor drive 40 and motor 45 may be referred to as an axis of motion, an axis of motion may also require multiple motors controlled by a single motor drive or multiple motor drives and multiple motors operating in tandem. In still other applications, a single motor drive may control multiple motors where each motor may be a separate axis of motion. The network 35 may also join with other devices in the controlled machine or process, including, for example, actuators, which may be controlled by output signals from the industrial controller 30, or sensors, which may provide input signals to the industrial controller.

According to the illustrated embodiment, the industrial control system 20 is configured to control a robot, R. The robot, R, is illustrated with six axes of motion, A1-A6. The number of axes and configuration of the robot is intended to be exemplary and not limiting. Although illustrated as a robot, R, with an arm and gripper connected to an end of the arm, it is contemplated that the robot, R, my include a tool changer to provide alternate tools to an end effector on the arm or the robot may be of alternate configurations, such as a delta robot with multiple arms used to position an end effector. The illustrated robot is mounted on a base, B, which for this example is the ground. The robot, R, includes a first axis, A1, mounted on the base and used to rotate the robot, R, around a vertical axis. The robot includes three additional axes (A2, A3, and A4) which each pivot one segment of the arm for the robot around a horizontal axis. A fifth axis, A5, is used to rotate the gripper, and a sixth axis, A6, is used to open and close the gripper. Each axis A1-A6 includes a separate motor drive 40 within a control cabinet 21 to control operation of the respective axis.

Referring next to FIG. 2, the processor module 34 includes a processor 50 communicating with a memory device 52 to execute an operating system program 51, generally controlling the operation of the processor module 34, and a control program 53, describing a desired control of the robot, R, and or any other industrial machine or process interacting with the robot, where each control program is typically unique to a given application of the industrial control system 20. The memory 52 may also include data tables and/or a kinematic model 55 of the robot, R, as used by the control program. The kinematic model 55 may be prepared offline in a separate computing device and downloaded into the industrial controller 30. Optionally, a user interface may be provided between the industrial controller 30 and a technician by which the kinematic model 55 is entered. The processor module 34 may communicate with other modules 36, 38 of the industrial controller 30 via a backplane 58 extending between backplane connectors 56.

The network module 36 includes a control circuit, which may include a microprocessor 60 and a program stored in memory 62 and/or dedicated control circuitry such as an application specific integrated circuit (ASIC) or field programmable gate array (FPGA). The control circuit may communicate with a network interface circuit 64 within the network module 36, where the network interface circuit 64 provides for execution of low-level electrical protocols on the industrial control network 35. Similar network interface circuits 84 may be provided on other devices, such as the motor drives 40, to provide communication between devices.

Each additional module 38 includes components according to the desired function of the module. Many additional modules 38 will include a processor 70 and memory 72, where the processor 70 is configured to execute instructions stored on the memory. Terminals 76 or ports provide a connection to devices external from the additional module 38 and control logic circuitry 74 is provided between the terminals 76 or ports and the processor 70 to receive signals from external devices and process the external signals for delivery to the processor 70. Similarly, the control logic circuitry 74 may receive output signals from the processor 70, process the output signals for delivery to external devices, and deliver the processed signals to the terminals 76 or ports on the module. The control logic circuit 74 may include, but is not limited to, buffers, analog-to-digital converters, digital-to-analog converters, voltage regulators, amplifier circuits, and the like.

Each motor drive 40 includes a controller 80 in communication with a memory device 82. The controller 80 may be implemented, for example, in a microprocessor, application specific integrated circuit (ASIC), field programmable gate array (FPGA), or other such customizable device. The memory device 82 may include transitory memory, non-transitory memory, persistent memory, or non-persistent memory, or a combination thereof. The memory device 82 may be configured to store data and programs, which include a series of instructions executable by the controller 80. It is contemplated that the memory device 82 may be a single device, multiple devices, or incorporated, for example, as a portion of another device such as an application specific integrated circuit (ASIC). The controller 80 is in communication with the memory 82 to read the instructions and data as required to control operation of the motor drive 40. The memory 82 stores configuration parameters 88 defining desired operation of the motor drive 40 and the configuration matrix 89, which includes the portion of the robotic kinematic model corresponding to an axis of motion controlled by the motor drive. The motor drive includes terminals 86 configured to supply voltage to the motor 45 and to receive position feedback signals from the encoder 42 mounted on the motor. According to the illustrated embodiment, a dedicated inter-module communication interface 85 and communication cable 87 is connected between each motor drive 40. According to one aspect of the invention, each motor drive 40 includes an output port and an input port with a pluggable connector configured to connect between the output port of one motor drive 40 and the input port of an adjacent motor drive. According to another aspect of the invention, the industrial network 35 may have sufficient bandwidth to handle the required inter-module communications. The inter-module communication interface 85 may be the interface circuit 84 for the industrial network 35 and the communication cable 87 may be a network cable for the industrial network.

Figure 3:
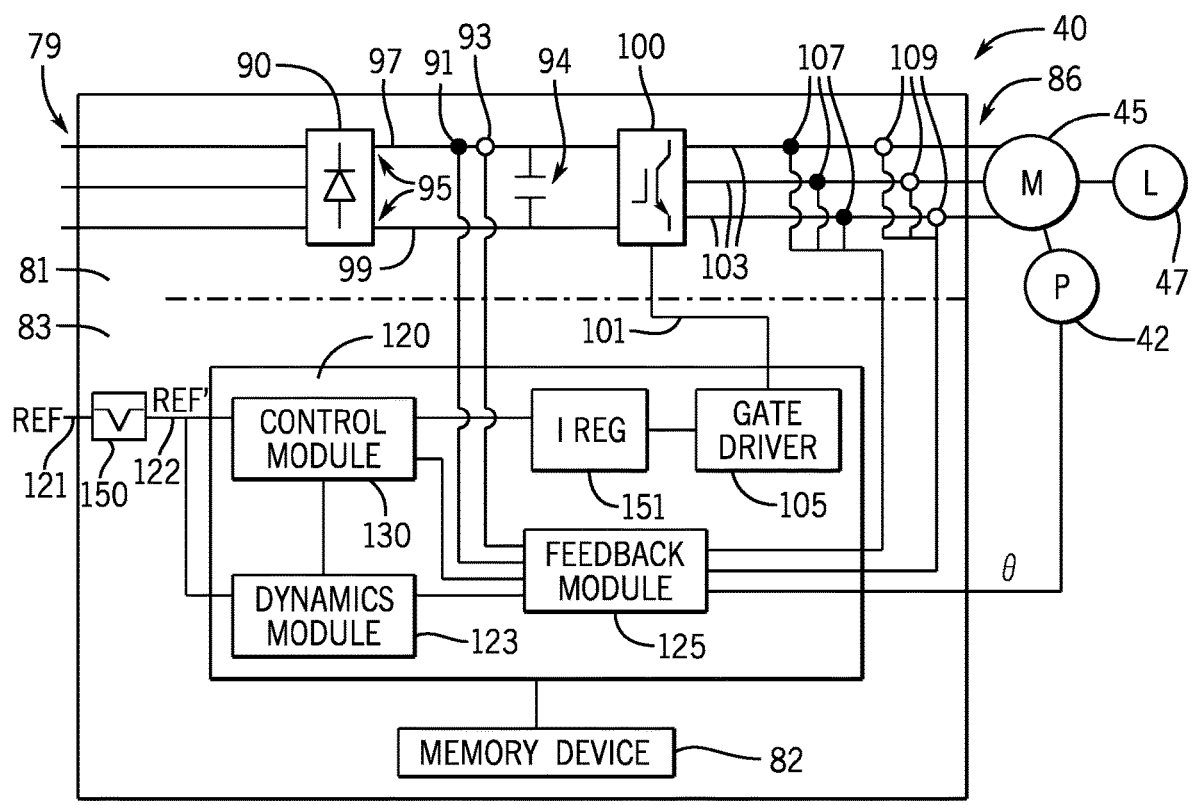
FIG. 3 is a block diagram representation of one motor drive of FIG. 2.

Turning next to FIG. 3, a motor drive 40, according to one embodiment of the invention, includes a power section 81 and a control section 83. The power section 81 includes components typically handling, for example, 200-575 VAC or 200-800 VDC, and the power section 81 receives power in one form and utilizes power switching devices to regulate power output to the motor 45 in a controlled manner to achieve desired operation of the motor 45. The control section 83 includes components typically handling, for example 110 VAC or 3.3-48 VDC and, the control section 83 includes processing devices, feedback circuits, and supporting logic circuits to receive feedback signals and generate control signals within the motor drive 40.

Figure 4:
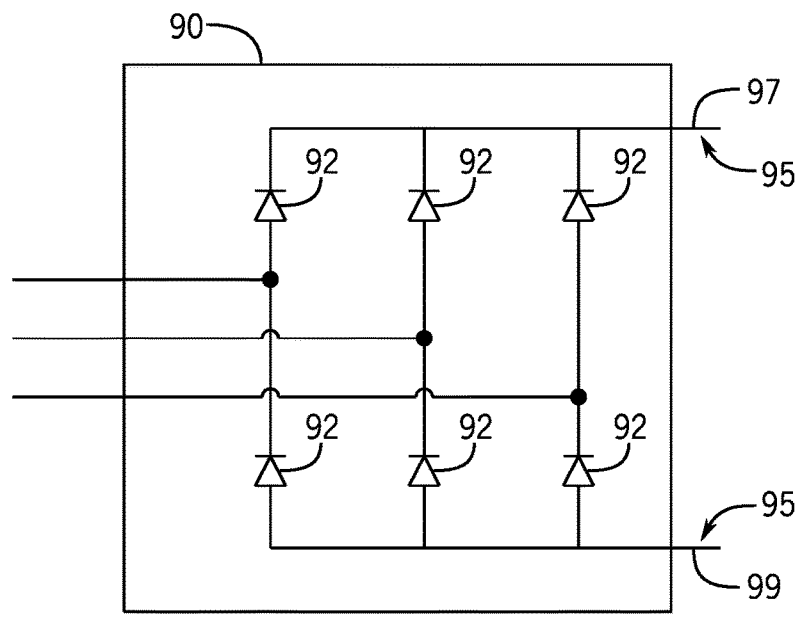
FIG. 4 is a schematic representation of a rectifier section for the motor drive of FIG. 3.

According to the illustrated embodiment, the motor drive 40 is configured to receive a three-phase AC voltage at an input 79 of the motor drive 40 which is, in turn, provided to a rectifier section 90 of the motor drive 40. The rectifier section 90 may include any electronic device suitable for passive or active rectification as is understood in the art. With reference also to FIG. 4, the illustrated rectifier section 90 includes a set of diodes 92 forming a diode bridge that rectifies the three-phase AC voltage to a DC voltage on the DC bus 95. Optionally, the rectifier section 90 may include other solid-state devices including, but not limited to, thyristors, silicon-controlled rectifiers (SCRs), or transistors to convert the input power 79 to a DC voltage for the DC bus 95. The DC voltage is present between a positive rail 97 and a negative rail 99 of the DC bus 95. A DC bus capacitor 94 is connected between the positive and negative rails, 97 and 99, to reduce the magnitude of the ripple voltage resulting from converting the AC voltage to a DC voltage. It is understood that the DC bus capacitor 94 may be a single capacitor or multiple capacitors connected in parallel, in series, or a combination thereof. The magnitude of the DC voltage between the negative and positive rails, 99 and 97, is generally equal to the magnitude of the peak of the AC input voltage.

Figure 5:
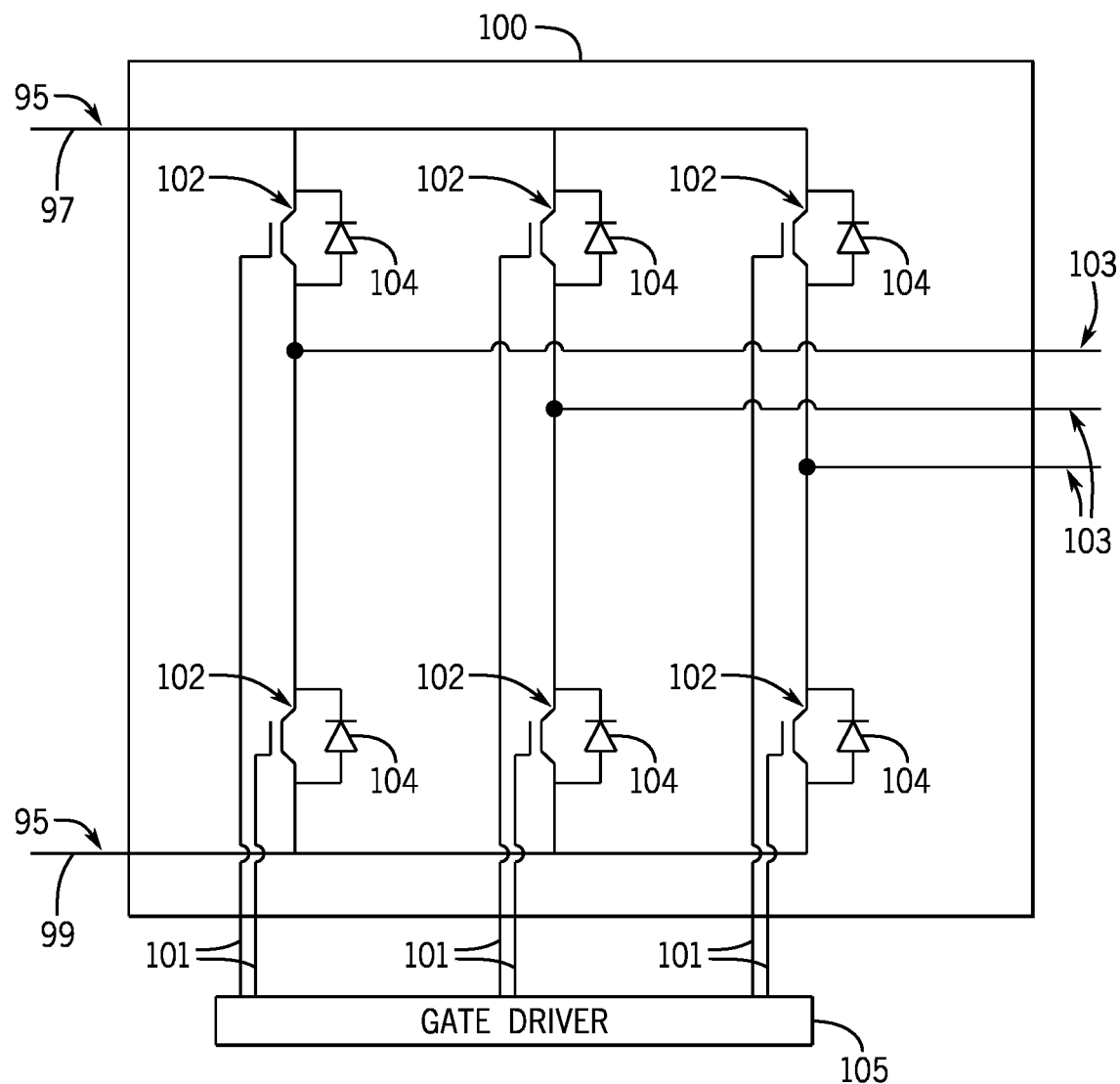
FIG. 5 is a schematic representation of an inverter section for the motor drive of FIG. 3.

The DC bus 95 is connected in series between the rectifier section 90 and an inverter section 100. Referring also to FIG. 5, the inverter section 100 consists of switching elements, such as transistors, thyristors, or SCRs as is known in the art. The illustrated inverter section 100 includes an insulated gate bipolar transistor (IGBT) 102 and a free-wheeling diode 104 connected in pairs between the positive rail 97 and each phase of the output voltage as well as between the negative rail 99 and each phase of the output voltage. Each of the IGBTs 102 receives gating signals 101 to selectively enable the transistors 102 and to convert the DC voltage from the DC bus 95 into a controlled three phase output voltage to the motor 45. When enabled, each transistor 102 connects the respective rail 97, 99 of the DC bus 95 to an electrical conductor 103 connected between the transistor 102 and the output terminal 86. The electrical conductor 103 is selected according to the application requirements (e.g., the rating of the motor drive 40) and may be, for example, a conductive surface on a circuit board to which the transistors 102 are mounted or a bus bar connected to a terminal from a power module in which the transistors 102 are contained. The output terminals 86 of the motor drive 40 may be connected to the motor 45 via a cable including electrical conductors connected to each of the output terminals 86.

One or more modules are used to control operation of the motor drive 40. Referring again to the embodiment illustrated in FIG. 3, a controller 120 includes the modules and manages execution of the modules. The illustrated embodiment is not intended to be limiting and it is understood that various features of each module discussed below may be executed by another module and/or various combinations of other modules may be included in the controller 120 without deviating from the scope of the invention. The modules may be stored programs executed on one or more processors 80, logic circuits, or a combination thereof.

The controller 120 receives at least one reference signal, Ref, 121 identifying desired operation of the motor 45 connected to the motor drive 40. The reference signal 121 may be, for example, a position reference ($\theta^*$), a speed reference ($\omega^*$), or a torque reference ($T^*$). For a high-performance servo control system, the reference signal 121 is commonly a position reference signal ($\theta^*$). Optionally, a motion profile or motion trajectory may include multiple reference signals, such as a position reference ($\theta^*$), a speed reference ($\omega^*$), and/or an acceleration reference ($\alpha^*$). The required reference 121 signals provided to the controller 120 vary according to an application's requirements.

For controlling an axis of a robot, R, the reference signal 121 may be in matrix form, where a desired position, speed, or torque for a link controlled by the axis is defined in a coordinate system. The coordinate system may be a general space coordinate system having an x-axis, a y-axis, and a z-axis defined at some location with respect to the robot. The coordinate system may be an axis coordinate system, where the axis coordinate system has an origin located, for example, at a center of an axis of rotation for the motor controlled by the axis. The matrix reference may include both linear and rotational elements including, for example, a desired speed or position in the x-axis, y-axis, and z-axis of the coordinate system as well as a desired angular velocity or angular position about an axis of rotation for each of the x, y, and z-axes. The reference signal 121 is provided to a dynamic notch filter 150 and a filtered reference signal 122 is output from the dynamic notch filter. The filtered reference signal 122 is used by the controller 120 to achieve desired operation of the axis.

The controller 120 also receives feedback signals indicating the current operation of the motor drive 40. According to the illustrated embodiment, the controller 120 includes a feedback module 125 that may include, but is not limited to, analog to digital (A/D) converters, buffers, amplifiers, and any other components that would be necessary to convert a feedback signal in a first format to a signal in a second format suitable for use by the controller 120 as would be understood in the art. The motor drive 40 may include a voltage sensor 91 and/or a current sensor 93 on the DC bus 95 generating a feedback signal corresponding to the magnitude of voltage and/or current present on the DC bus 95. The motor drive 40 may also include one or more voltage sensors 107 and/or current sensors 109 on the output phase(s) of the inverter section 100 generating a feedback signal corresponding to the magnitude of voltage and/or current present on the electrical conductors 103 between the inverter section 100 and the output 86 of the motor drive. A position feedback device 42 is connected to the motor 45 and operable to generate a position feedback signal, $\theta$, corresponding to the angular position of the motor 45. The motor drive 40 includes an input configured to receive the position feedback signal from the position feedback device 42. It is contemplated that the input may configured to receive a sinusoidal feedback signal, a square wave, a digital pulse train, a serial communication data packet, or a combination thereof according to the configuration of the position feedback device 42. The feedback signals are processed by the feedback module 125 and converted, as necessary, to signals for the control module 130. The controller 120 utilizes the feedback signals and the reference signal 121 to control operation of the inverter section 100 to generate an output voltage having a desired magnitude and frequency for the motor 45.

In operation, the industrial controller 30 monitors the position of each axis in the multi-axis system 20 and determines the appropriate notch filter to supply to each drive 40 to achieve desired operation of the multi-axis system 20. With reference again to the exemplary robot, R, shown in FIG. 1, motion of one link in the robot, R, causes motion in each of the successive links. As discussed above, each link acts as a spring-mass system. Thus, forces applied to a link will cause some excitation of the spring component in the system. The amount of excitation may vary as a function of the position of each link, also referred to as the pose of the robot, and of the payload being handled by the robot.

One option for reducing the effects of the spring-mass operation of each link is to provide a dedicated computation device external to the industrial controller 30 to determine motion commands for each axis. The dedicated computation device includes a complex dynamic model for the robot, R, which models each link as a spring-mass system and further varies the model as a function of the pose of the robot. These complex models may generate motion commands to reduce excitation of oscillation in one or more of the links. This dynamic model, however, includes complex mathematical computations requiring substantial processing capabilities and, consequently, the need for the dedicated computation device. The dedicated computation device determines a torque command for each joint as a result of the desired motion trajectory for the end effector and transmits the torque command to each motor drive 40. The dedicated computation device, however, adds cost and complexity to the control system. Additionally, communication delays along the industrial network and between the computation device and each motor drive requires lower bandwidth control of the motor drive 40 than traditional servo control to permit sufficient time for the motor drive to receive commands. The torque commands, which are an open-loop command, also rely on the accuracy of the dynamic model and on the accuracy of the torque command to achieve a desired angular position of the motor.

The present invention utilizes the industrial controller 30 and motor drives 40 to control each axis, A, of the robot, R. The control structure enables servo control, utilizing closed-loop position control, for each motor 45. The industrial controller 30 and motor drives 40, however, do not typically include the complex dynamic model for the robot, R, nor does one processor (50 or 80) in the industrial controller 30 or the motor drive 40 have sufficient processing bandwidth to perform the complex computations and the determination of spring-mass dynamics that may be performed in a dedicated external processing device. Thus, the present invention includes a dynamic notch filter 150 which identifies frequencies at which the robot, R, may experience undesired oscillations and attenuates command signals at those frequencies. The dynamic notch filter 150 is configured to attenuate undesired dynamic components with the greatest amplitude such that the filtering of oscillations generated by the axes at all frequencies is not needed.

Figure 6:
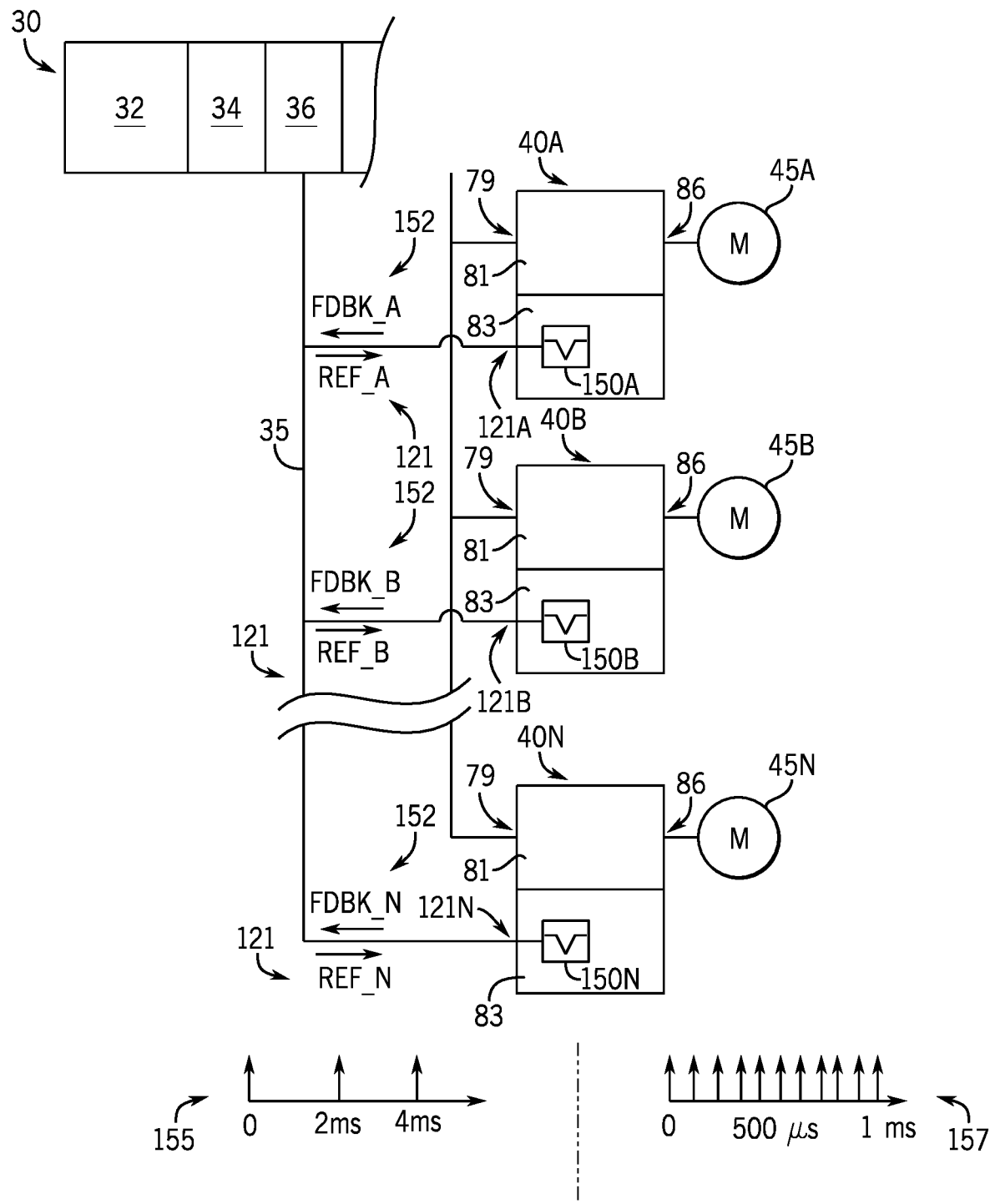
FIG. 6 is a partial schematic representation of the control system of FIG. 1.

With reference next to FIG. 6, a partial schematic representation of the industrial control system 20 illustrates a portion of the communication between the industrial controller 30 and each motor drive 40 and further illustrates a portion of the update intervals at which the industrial controller 30 and the motor drives 40 operate. It is noted that FIG. 6 illustrates multiple motor drives 40A, 40B, 40N indicating that varying numbers of motor drives 40 may be connected to and receive reference signals 121 from the industrial controller. Similarly, elements of each motor drive, such as the reference signal 121A, 12B, 121N or notch filter 150A, 150B, 150N are shown with separate numerals, indexed by the letters A, B, and N. For ease of discussion, the motor drives and elements may be referred to herein, generally, by just the numerals and are referenced specifically by a numeral indexed by the letter. The industrial controller 30 generates reference signals 121 for each motor drive 40 at a first periodic update rate 155 and transmits the reference signals to each motor drive. According to the illustrated embodiment, the first periodic update rate 155 is set to two milliseconds. This first periodic update rate 155 may be set as a function of the industrial controller 30 transmitting the reference signals or of the motor drive 40 receiving the reference signals. Further, it is contemplated that the first periodic update rate 155 is configurable and may be set to a desired value based on the application requirements. As indicated above, the reference signal 121 may define desired operation of the link controlled by the axis motor 45. The reference signal 121 may include a desired position for a center of mass of the link in an axis coordinate system, corresponding to the axis controlled by the motor 45, or in a space coordinate system, corresponding to a reference coordinate system for the robot. The reference signal 121 may further include rotational coordinates corresponding to angular positions for the link at the center of mass with respect to the x, y, and z axes for the coordinate system. Alternately, the industrial controller 30 may convert robot commands into position reference commands and transmit the position reference commands directly to each motor drive 40.

According to one aspect of the invention, the motor drive 40 is configured to read the reference signal 121 at the same first periodic update rate as the rate at which the industrial controller 30 transmits the reference signal 121. The reference signal 121 is provided as an input to a dynamic notch filter 150 within the motor drive 40 and a filtered reference signal is output. Each motor drive 40 uses this filtered reference signal to determine an angular position reference for the motor 45 which can then be controlled by the motor drive. The motor drive 40 may further execute the conversion from the filtered reference signal to a motor reference signal in the same first periodic update rate at which the reference signal 121 is received.

In addition to the reference signal 121 including a command for desired operation of the motor 45, each reference signal 121 may also include a command for the notch filter 150. It is contemplated that a single data packet may be transmitted between the industrial controller 30 and each motor drive 40 at the first update rate 155. The single data packet may include a first command for the dynamic notch filter 150 and a second command for the desired operation of the motor 45. Optionally, the command for the notch filter 150 and for desired operation of the motor 45 may be transmitted in separate data packets. During each update period, the notch filter 150 is first updated based on the command received for the notch filter, and the command for desired operation of the motor is passed through the notch filter 150 to obtain the filtered reference signal. According to another aspect of the invention, the command for the dynamic notch filter may be determined at an update rate other than the first update rate. The additional update rate may be a multiple of the first update rate. For example, the command for the dynamic notch filter may be determined at one-half the frequency of the motion command. Data packets between the industrial controller 30 may alternate between including both the first command for the dynamic notch filter 150 and the second command for the desired operation of the motor 45 and including just the second command for the desired operation of the motor 45. Optionally, separate data packets may be provided, where a first data packet includes the first command for the dynamic notch filter 150 and a second data packet includes the second command for the desired operation of the motor 45. Each data packet is transmitted at the update rate at which the respective command is determined.

The filtered reference signal is provided to the controller 120 to determine a desired output voltage and/or output current for the motor 45 in order to achieve desired operation. The current regulator 151 and gate driver 105 execute at a second update rate 157 to generate the switching signals 101 for the inverter section 100 to generate the desired output voltage for the motor 45. According to the illustrated embodiment, the second update rate 157 is set to ten kilohertz. It is contemplated that the second update rate 157 may be configurable and set from a range of about two kilohertz or up to one hundred kilohertz based on the application requirements. The second update rate 157 is faster than the first update rate 155 and preferably at least an order of magnitude faster than the first update rate.

Figure 7:
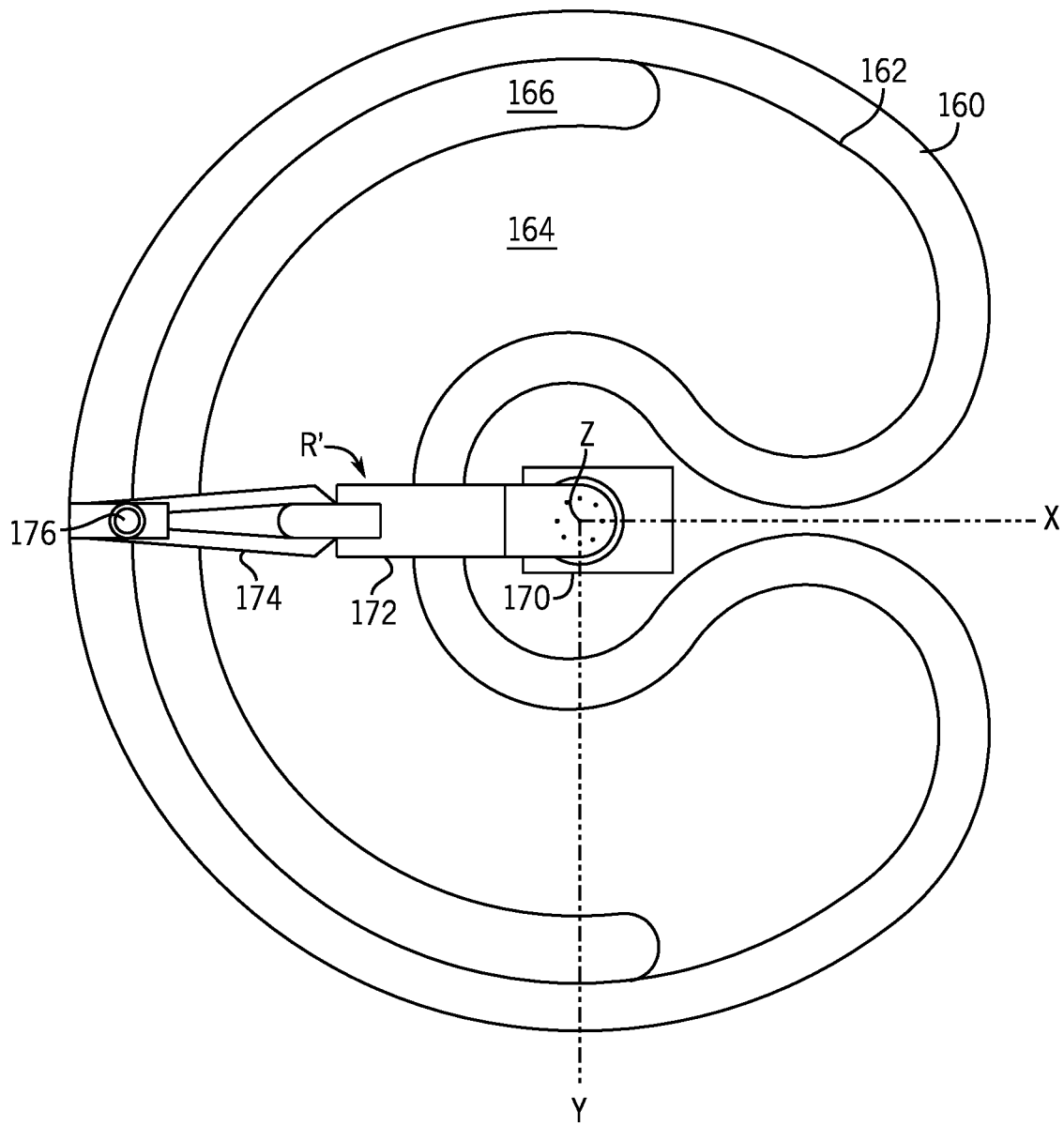
FIG. 7 is a top plan view of an operating region for a robot and control system incorporating one embodiment of the invention.
Figure 8:
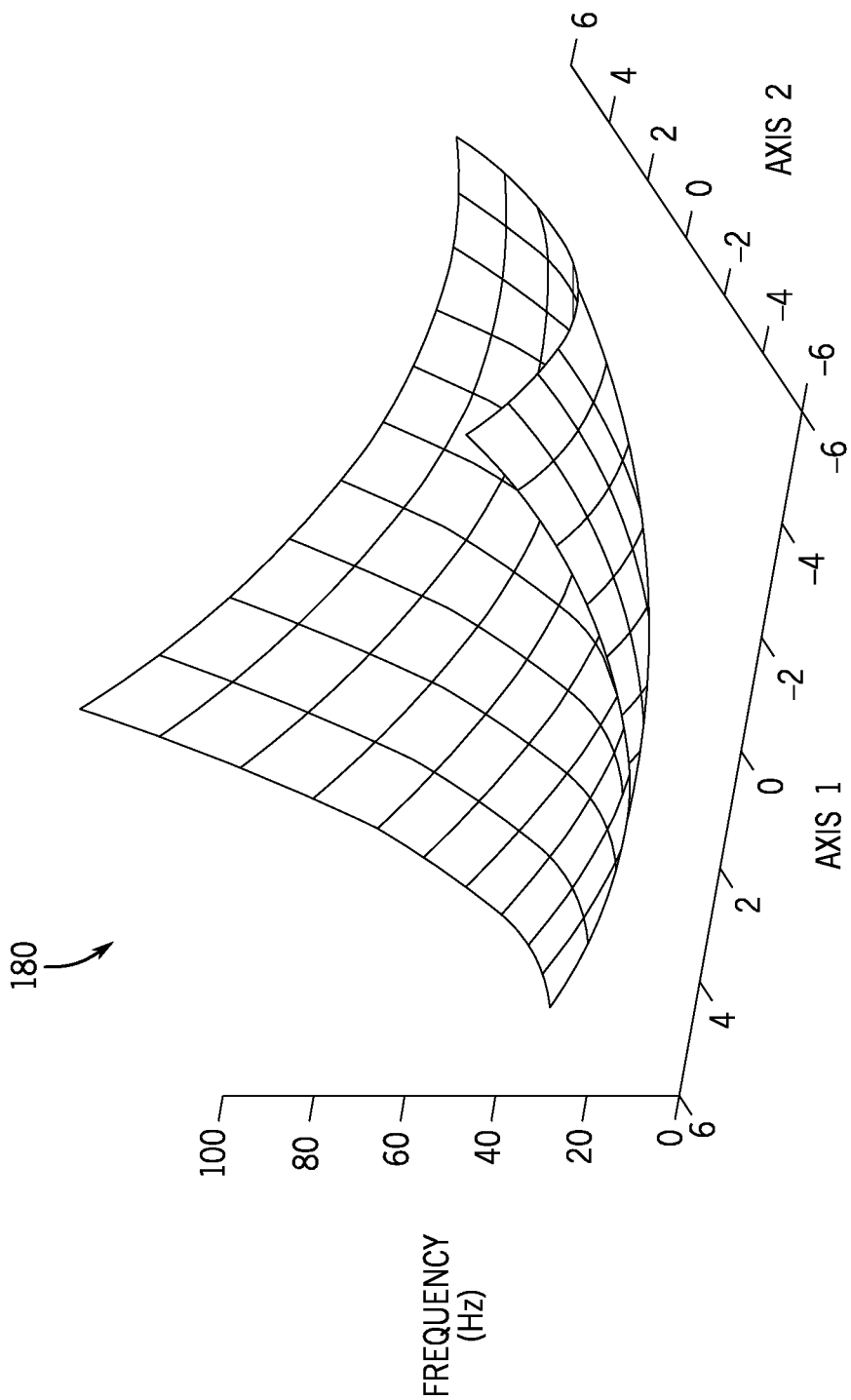
FIG. 8 is an exemplary surface map identifying amplitude of oscillation for an exemplary robot over two axes of operation.

With reference next to FIGS. 7 and 8, it is contemplated that the command for the dynamic notch filter 150 may take one of several forms. Turning initially to FIG. 7, the command for the dynamic notch filter may be an enable or disable signal. A first outline defines a first region of travel 160 for the robot, R'. This first region of travel 160 is the area, over the x-y plane, in which at least a portion of the robot, R', may be located during operation. A second outline defines a second region of travel 162 for the robot, R'. This second region of travel 162 is a work zone and defines the region in which the end-effector 176 for the robot, R', may be positioned. According to the illustrated embodiment, the work zone 162 is slightly smaller than the overall travel zone 160 for the robot. In some applications, the robot may be configured, such that the end effector may reach the most distal travel region and the two zones may overlap each other.

The illustrated robot, R', in FIG. 7 includes a base 170 on which the robot rotates and two links (172, 174) extending from the base. When the two links (172, 174) are positioned closer to the base 170, the robot, R', experiences more stable operation. The first link 172 extends at least partly upward and the second link 174 extends at least partly downward, creating a v-shaped arm. As the links 172, 174 extend such that the reach of the robot, R', approaches a more fully extended operation with the first link 172 extending from the base and the second link 174 extending from the first link 174, the two links tend to more closely approximate a single, longer arm. In a horizontal, extended position, the arm acts more like a lever and is more impacted by forces due to gravity. The illustrated robot, R', experiences more oscillation within the region of operation 166 at which the arm is in this more fully horizontal extension. Thus, the region outlined in an arc proximate the outer reach of the work zone 162 is defined as an enable zone 166. The remaining portion of the work zone 162, outside the enable zone 166, is defined as a disable zone 164.

During operation, each motor drive 40 receives position feedback information from an encoder, resolver, or other such position feedback device 42 connected to the motor 45. The motor drive 40 generates a feedback packet 152 to the industrial controller 30 with the position information for the corresponding axis. The controller 30 receives a first position feedback data 152A from the first motor drive 40A, second position feedback data 152B from the second motor drive 40B and so on until the controller 30 receives nth position feedback data 152N from the nth motor drive 40N. Having received position feedback data from each motor drive 40, the controller 30 is able to determine a location of the end effector within the work zone 162. When the end effector is within the enable zone 166, the controller 30 generates an enable signal and transmits the enable signal to the motor drive 40. When the end effector is within the disable zone 164, the controller 30 generates a disable signal and transmits the disable signal to the motor drive 40. Optionally, the controller 30 may just generate an enable signal and transmit the enable signal when the end effector is located in the enable zone 166 and stop transmitting the enable signal when the end effector is located in the disable zone 164. When an enable signal is transmitted from the controller 30 to the motor drive 40, the motor drive 40 is configured to pass the motion command through the dynamic notch filter 150. When the disable signal is present or the enable signal is removed, the motor drive 40 is configured to bypass the dynamic notch filter 150 and use the unfiltered motion command.

Turning next to FIG. 8, the command for the dynamic notch filter may include a dynamic frequency value. A surface map 180 may be generated, corresponding to operation of the robot, R. The illustrated surface map identifies a first axis, Axis 1, a second axis, Axis 2, and a frequency of oscillation. The first and second axes are intended to be illustrative only and are not limiting. Further, two axes are presented for ease of illustration. It is contemplated that oscillations may be defined for any number of dimensions and may include, for example, a table containing a maximum oscillation value defined for each pose of a robot based on various position values of each robot axis or of different dimensions in a Cartesian coordinate system. According to the illustrated embodiment, the two axes define a plane of operation for the robot, but alternately may correspond to any pair of reference values for a motion command provided to the motor drive 40. For example, if the motion command 121 is a matrix command including both desired position in a cartesian coordinate system as well as a desired rotation about each of the axes in the cartesian coordinate system, any two of these values may be utilized. The axes may correspond to linear axes or rotational positions of a robot axis. For the pair of axes, a surface map 180 defines a dominant frequency at which oscillation is observed across the operating ranges of the axes. According to the illustrated embodiment, overall oscillation of the robot is minimal when an end effector of the robot, R, is positioned closer to an origin of the two axes. As the end effector approaches a maximum positive position for the two axes, the amplitude of oscillation is greatest at about one hundred hertz. As the end effector approaches a maximum positive position for one axis and a maximum negative position for the other axis, the amplitude of oscillation is greatest at about twenty hertz. As the end effector approaches a maximum negative position for both axes, the amplitude of oscillation is greatest at about forty hertz.

As indicated above, each motor drive 40 receives position feedback information from an encoder, resolver, or other such position feedback device 42 connected to the motor 45 as the motor drive 40 controls operation of the motor. The motor drive 40 generates a feedback packet 152 to the industrial controller 30 with the position information for the corresponding axis. The controller 30 receives a first position feedback data 152A from the first motor drive 40A, second position feedback data 152B from the second motor drive 40B and so on until the controller 30 receives nth position feedback data 152N from the nth motor drive 40N. Having received position feedback data from each motor drive 40, the controller 30 is able to determine a location of the end effector along the surface map 180. The controller 30 identifies the dominant frequency of oscillation and sets the desired frequency for the dynamic notch filter 150 to this dominant frequency of oscillation. The desired frequency is transmitted from the controller 30 to the motor drive 40 as the command for the notch filter 150. The motor drive 40 is then able to set the frequency at which the dynamic notch filter 150 operates to the frequency at which maximum oscillation would occur to attenuate command components that would otherwise tend to excite the system and cause oscillation at this frequency.

According to one aspect of the invention, the controller 30 may be configured to store values for the surface map 180 in a lookup table in memory 52 of the controller. The surface map 180 may be determined in advance based on simulation or modelling of operating performance by the robot, R, and values for the surface map 180 may be stored in memory 52. Alternately, the surface map 180 may be generated during a commissioning process. The robot, R, may be operated at different operating points defined by the two axes and the resulting oscillation observed at each operating point defines the surface map 180 and is stored in memory 52. The look up table may be generated initially during the commissioning process and/or ongoing updating of the look up table may be performed during ongoing operation of the robot. During operation, the controller 30 may select a value from the look up table that is closest to a current operating point along each of the two axes. Optionally, the controller 30 may be configured to interpolate between values in the look-up table in order to obtain a value closed to the current operating point of the two axes.

According to another aspect of the invention, an equation may be developed to predict operating performance of the robot, R. The equation may be generated based on observed or modelled performance of the robot at different operating points. A regression analysis of the results may be used to predict a frequency at which maximum oscillation will occur for varying operating points. Equation 1 provides the form of an exemplary equation resulting from regression analysis, which will generate a maximum frequency of oscillation based on the position of the second and third joints for the robot. During operation, the industrial controller 30 receives feedback signals from each motor drive 40 providing the angular position of each joint controlled by the motor drive 40 and determines a maximum frequency of oscillation as a function of the present positions of each joint. The industrial controller 30 may then transmit this maximum frequency back to each motor drive 40 as a command frequency for the dynamic notch filter 150 executing in each motor drive 40.

$$F_{max} = A_1 \cdot J_3 + A_2 \cdot J_2^2 + A_3 \cdot J_2 + A_4 + A_5 \cdot x \qquad (1)$$

where:
$F_{max}$ is the frequency at which maximum oscillation occurs;
$A_1$-$A_5$ are coefficients of the regression analysis;
$J_3$ is an angle at which the link controlled by the third joint is positioned with respect to the end of the link controlled by the second joint;
$J_2$ is an angle at which the link controlled by the second joint is positioned with respect to the base; and
x is a distance between a center point of the base and a center point of a tool for the robot.

According to another aspect of the invention, the industrial controller 30 may utilize a combination of the above-described methods for generating a command to the dynamic notch filter 150 on each motor drive 40. For example, a first step in generating the command may be monitoring a location of the end-effector of a robot. Rather than defining a single enable zone 166, such as that illustrated in FIG. 7, multiple enable zones 166 may be defined. Each enable zone may correspond, for example to a work zone where a desired performance of the robot, R, has higher performance standards. In non-work zones, the arm of the robot may simply be traversing between locations and not interacting with a work product. Reduction of oscillation in the traversal zone may not be necessary. Within each of the enable zones, the industrial controller 30 may first generate an enable signal for the dynamic notch filter 150, enabling operation of the filter. Additionally, there may be different operating characteristics for the robot, R, within each enable zone. Each enable zone may have its own lookup table or regression equation, defining expected oscillation during operation within the corresponding enable zone. The controller 30 obtains the desired frequency for filtering as a function of the table or equation corresponding to the zone and transmits the desired frequency to each motor drive 40 during operation within the enable zone. Still other methods of generating an enable command or frequency command to be provided to each motor drive 40 may be utilized without deviating from the scope of the invention.

Each motor drive 40 is configured to provide data to the industrial controller 30, where the data may be used to select a desired frequency and/or to train the industrial controller 30 for selection of the desired frequency. As previously discussed, each motor drive 40 receives position feedback information from a position feedback device 42 mounted to the motor 45. This position feedback information may be provided to the industrial controller 30 so the industrial controller 30 is able to determine a pose for the robot, R. Additionally, the position feedback information includes dynamic components corresponding to oscillation occurring in the controlled axis. The motor drive 40 utilizes position feedback data at a higher sampling rate to provide servo control of the motor 45 than may typically be transmitted between the motor drive 40 and the controller 30. If each axis transmitted position feedback data at a sampling rate required for closed loop position control, the bandwidth of the industrial network between the industrial controller 30 and each motor drive 40 could be exceeded, resulting in dropped data packets and inconsistent data transfer. According to one aspect of the invention, the feedback data may be stored as data sets and periodically provided between each motor drive 40 and the industrial controller 30 for subsequent analysis.

According to another aspect of the invention, each motor drive 40 is configured to perform a frequency analysis on the position feedback signal in real-time and provide information from the frequency analysis to the industrial controller 30. The motor drive 40 may utilize the position reference for the motor 45 as an input and the position feedback signal as an output and analyze the frequency response of the controlled system. The frequency response will identify frequency components present within the controlled system. A dominant component in the frequency response is typically the commanded frequency of operation. Additional components in the frequency response identify, for example, frequencies at which the motor is experiencing vibration or oscillation. The frequency response may be determined initially during a commissioning process to identify oscillation components present in each axis at different operating conditions. The different operating conditions may be different speeds of operation, different locations of operation, or the like. The motor drive 40 may further be configured to identify a peak frequency component from the frequency response and transfer the peak frequency response to the industrial controller 30. Optionally, the motor drive 40 may be configured to perform a frequency response continually during operation using, for example, a discrete Fourier analysis. According to still another aspect, the motor drive 40 may periodically execute a frequency response rather than continually monitoring operation. In either instance, the motor drive 40 transmits the frequency response, or a peak component of the frequency response, to the industrial controller 30 to periodically update operating characteristics of the system stored in the industrial controller 30.

With reference again to FIG. 6, each robot, R, includes multiple motor drives 40, each controlling at least one motor 45 for one axis of the robot. Each of the axes works in tandem to achieve a desired motion trajectory for the end effector of the robot between two points. For the illustrated embodiment, the industrial controller 30 receives the desired motion trajectory for the robot, R, and converts this motion trajectory for the robot into separate motion trajectories for each axis. The industrial controller 30 then transmits the desired motion trajectory for each axis as the motion command 121 to each motor drive 40.

In order for the robot, R, to achieve the desired motion trajectory, it is desirable for each motor drive 40 to be operating with a similar control architecture. A notch filter introduces a delay in a signal being processed by the filter. Also, by its nature, the notch filter removes components of the signal that are present at the filtered frequency. With respect to the dynamic notch filters 150 provided in each motor drive 40, therefore, it is desirable to have each dynamic notch filter 150 enabled or disabled in tandem. Similarly, it is desirable to have each dynamic notch filter 150 executing at the same frequency when the filters are enabled. If a portion of the motor drives 40 are filtering the motion command 121 and a portion of the motor drives 40 are not filtering the motion command, the portion of motor drives filtering the motion command transfer a filtered motion command to the control loops with an inherent delay when compared to those motor drives not filtering the motion command. Further, the motor drives 40 filtering the motion command will be removing components of the motion trajectory that may generate oscillation. However, if a portion of the motor drives 40 are not filtering the motion command or are filtering components at a different frequency, the coordinated motion, which was initially determined by the industrial controller 30 is no longer occurring at the motor drives 40. Each axis will be modifying its respective motion command and, potentially, in a different manner than other axes, resulting in a final motion trajectory of the end effector that is not at the desired trajectory.

In order to provide uniform filtering between each axis of the robot, R, the industrial controller 30 may be configured to identify a dominant component from among multiple frequencies. As indicated before, the motor drive 40 from each axis may provide frequency response feedback to the industrial controller 30 with frequency components for the corresponding axis. The industrial controller 30 monitors the frequency components from each of the axes and identify which axis has a frequency of oscillation with the highest amplitude. The frequency of oscillation with the greatest amplitude at each position may be used as the desired frequency for the dynamic notch filter 150 in each motor drive 40. The oscillation with the highest amplitude is then filtered out and each motor drive 40 is configured to operate with uniform notch filters. As another aspect of the invention, each motor drive 40 may include multiple notch filters. With multiple notch filters, the industrial controller 30 may select additional frequencies for filtering. A separate command frequency for each dynamic notch filter 150 is provided to the motor drives 40.

According to still another aspect of the invention, a dynamic notch filter 150 may be included in the industrial controller 30. Operation of the dynamic notch filter 150 in the industrial controller is consistent with that discussed above with respect to dynamic notch filters 150 present in each of the motor drives 40. The dynamic notch filter 150 may be enable/disabled and/or receive a dynamic frequency of operation. The motion command to each motor drive 40 may pass through the dynamic filter within the industrial controller such that a filtered command signal is transmitted from the industrial controller 30 to each motor drive 40.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for reducing mechanical oscillations in a multi-axis control system, the method comprising the steps of:
   receiving at a plurality of motor drives a first command for a dynamic notch filter at a first update rate, wherein each of the plurality of motor drives is operatively connected to a motor for an axis in the multi-axis control system;
   receiving at the plurality of motor drives a second command for desired operation of the motor at a second update rate;
   changing operation of the dynamic notch filter in each of the plurality of motor drives as a function of the first command at the first update rate; and
   generating a desired output voltage for desired operation of the motor from the motor drive at a third update rate, wherein:
      the third update rate is faster than the second update rate,
      the second command is passed through the dynamic notch filter to generate a filtered command, and
      the desired output voltage is generated as a function of the filtered command.

2. The method of claim 1 wherein the first update rate is the same as the second update rate.

3. The method of claim 1, wherein the first command is an enable command for the dynamic notch filter.

4. The method of claim 1, wherein the first command is a desired frequency for the dynamic notch filter.

5. The method of claim 4, wherein a controller operative to generate the first command includes a memory configured to store either an equation to determine the desired frequency or a lookup table containing a plurality of values for the desired frequency.

6. The method of claim 5 further comprising the steps of:
   generating a frequency response in each of the plurality of motor drives, wherein the frequency response is generated as a function of the second command and of a position feedback signal corresponding to an angular position of the motor for the axis to which the motor drive is connected;
   transmitting the frequency response from each of the plurality of motor drives to the controller; and
   determining the equation or the lookup table in the controller as a function of the frequency response from each of the plurality of motor drives.

7. The method of claim 1, wherein the first and second commands are received from a controller, the method further comprising the steps of:
   transmitting from each of the plurality of motor drives to the controller a position feedback signal corresponding to an angular position of the motor for the axis to which the motor drive is connected; and
   determining in the controller the first command as a function of the position feedback signal received from each of the plurality of motor drives.

8. The method of claim 1, wherein:
   the second command is a matrix defining desired operation of a link controlled by the axis in a plurality of dimensions, and
   the dynamic notch filter includes a plurality of notch frequencies, wherein each of the plurality of notch frequencies corresponds to one of the plurality of dimensions.

9. The method of claim 1, wherein:
   the second command is a matrix defining desired operation of a link controlled by the axis in a plurality of dimensions, and
   the dynamic notch filter includes a single frequency, corresponding to one of the plurality of dimensions.

10. The method of claim 1, wherein the dynamic notch filter is a first dynamic notch filter, the method further comprising the steps of:
    receiving at the plurality of motor drives a third command for a second dynamic notch filter at the first update rate; and
    changing operation of the second dynamic notch filter in each of the plurality of motor drives as a function of the third command at the first update rate, wherein the second command is passed through the first dynamic notch filter and the second dynamic notch filter to generate the filtered command.

11. A system for reducing mechanical oscillations in a multi-axis control system, the system comprising:
    an industrial controller operative to generate a first command at a first update rate and a second command at a second update rate, wherein the first command is for a dynamic notch filter and the second command is a desired motion of at least one motor; and
    a plurality of motor drives in communication with the industrial controller, wherein each motor drive:
       controls operation of at least one motor in the multi-axis control system, receives the first command and the second command from the industrial controller, changes operation of the dynamic notch filter as a function of the first command at the first update rate, passes the second command through the dynamic notch filter to obtain a filtered command, and generates an output voltage for desired operation of the at least one motor connected to the motor drive as a function of the filtered command.

12. The system of claim 11, wherein the first update rate is the same as the second update rate.

13. The system of claim 11, wherein the first command is an enable command for the dynamic notch filter.

14. The system of claim 11, wherein the first command is a desired frequency for the dynamic notch filter.

15. The system of claim 11, wherein:

the second command includes a plurality of motion commands, each of the plurality of motion commands corresponds to one of the plurality of motor drives, and the industrial controller transmits each of the plurality of motion commands to a corresponding motor drive at the second update rate.

16. The system of claim 15, wherein each of the plurality of motor drives is further configured to:

generate a frequency response as a function of the second command and of a position feedback signal corresponding to an angular position of the at least one motor to which the motor drive is connected; and transmit the frequency response from each of the plurality of motor drives to the industrial controller.

17. The system of claim 16, wherein:

the industrial controller further includes a memory configured to store either an equation to determine the first command or a lookup table containing a plurality of values for the first command; and the industrial controller is further configured to determine the equation or the plurality of values for the lookup table as a function of the frequency response from each of the plurality of motor drives.

18. The system of claim 11, wherein:

each of the plurality of motor drives is further configured to:

receive a position feedback signal corresponding to an angular position of the at least one motor to which the motor drive is connected, and transmit the position feedback signal to the industrial controller; and the industrial controller is further operative to determine the first command as a function of the position feedback signal received from each of the plurality of motor drives.

19. A method for reducing mechanical oscillations in a multi-axis control system, the method comprising the steps of:

receiving at each of a plurality of motor drives a feedback signal corresponding to an angular position of a motor, wherein the motor is operatively connected to one of the plurality of motor drives and the feedback signal is provided to a corresponding motor drive to which the motor is operatively connected;

transmitting the angular position of the motor from each of the plurality of motor drives to an industrial controller;

generating at the industrial controller a first command for a dynamic notch filter at a first update rate;

generating at the industrial controller a second command for desired operation of the motor connected to each of the plurality of motor drives at a second update rate;

changing operation of the dynamic notch filter as a function of the first command at the first update rate;

passing the second command through the dynamic notch filter to generate a filtered command;

generating a desired output voltage for desired operation of the motor in each of the plurality of motor drives at a third update rate and as a function of the filtered command, wherein the third update rate is faster than the second update rate.

20. The method of claim 19, wherein each of the plurality of motor drives includes a dynamic notch filter, the method further comprising the step of transmitting the first command from the industrial controller to each of the plurality of motor drives.

* * * * *